United States Patent
Lee

(10) Patent No.: US 10,844,956 B2
(45) Date of Patent: Nov. 24, 2020

(54) PISTON RING FOR ENGINE

(71) Applicants: HYUNDAI MOTOR COMPANY, Seoul (KR); KIA MOTORS CORPORATION, Seoul (KR)

(72) Inventor: Min Yong Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 148 days.

(21) Appl. No.: 16/003,177

(22) Filed: Jun. 8, 2018

(65) Prior Publication Data

US 2019/0257424 A1   Aug. 22, 2019

(30) Foreign Application Priority Data

Feb. 22, 2018  (KR) .................... 10-2018-0021029

(51) Int. Cl.
*F16J 9/20* (2006.01)
*F16J 9/22* (2006.01)

(52) U.S. Cl.
CPC .............. *F16J 9/206* (2013.01); *F16J 9/20* (2013.01); *F16J 9/203* (2013.01); *F16J 9/22* (2013.01)

(58) Field of Classification Search
CPC .................. F16J 9/20; F16J 9/203; F16J 9/22
USPC ................................................ 277/459, 465
See application file for complete search history.

(56) References Cited

U.S. PATENT DOCUMENTS

| | | | | |
|---|---|---|---|---|
| 1,393,542 A * | 10/1921 | Kistner | ..................... | F16J 9/20 277/434 |
| 2,591,920 A * | 4/1952 | Colvin | ..................... | F16J 9/00 277/434 |
| 3,414,277 A * | 12/1968 | Schmidt | ..................... | F16J 9/00 277/459 |
| 5,253,878 A * | 10/1993 | Miura | ..................... | F16J 9/14 277/499 |
| 6,367,808 B1 * | 4/2002 | Feistel | ..................... | F16J 9/16 277/490 |
| 6,588,214 B2 * | 7/2003 | Mack | ..................... | F01D 9/023 60/798 |
| 6,631,908 B2 * | 10/2003 | Mittler | ..................... | F16J 9/20 277/458 |
| 6,715,767 B1 * | 4/2004 | Meernik | ..................... | F16J 9/14 277/459 |
| 7,494,129 B2 * | 2/2009 | Breuer | ..................... | F16J 9/14 277/466 |
| 8,092,159 B2 * | 1/2012 | Maldonado | ............. | F01D 5/186 29/889.721 |
| 2004/0051252 A1 * | 3/2004 | Meernik | ..................... | F16J 9/14 277/459 |

FOREIGN PATENT DOCUMENTS

KR    2016-0086769 A    7/2016

* cited by examiner

*Primary Examiner* — Nicholas L Foster
(74) *Attorney, Agent, or Firm* — Morgan, Lewis & Bockius LLP

(57) ABSTRACT

A piston ring for an engine includes a compression ring fitted into one of a plurality of ring grooves of a piston head, wherein the compression ring has a first section of which a cross-section has a quadrangular shape and a second section of which a cross-section has an internal bevel shape having a bevel surface on a top corner of an inner peripheral surface, the first section and the second section alternately arranged along a circumferential direction of the piston ring.

7 Claims, 4 Drawing Sheets

PISTON RING FOR ENGINE

CROSS REFERENCE TO RELATED APPLICATION

The present application claims priority of Korean Patent Application No. 10-2018-0021029 filed on Feb. 22, 2018, the entire contents of which is incorporated herein for all purposes by this reference.

TECHNICAL FIELD

The present disclosure relates to a piston ring for an engine which can stably behave under various driving conditions.

BACKGROUND

A piston reciprocates in a cylinder and maintains airtightness between a combustion chamber and a crank chamber during a cycle stroke of an internal combustion engine.

Briefly looking out constitution of the piston, a piston bead has a plurality of ring grooves along its circumferential direction, and piston rings are fitted into the ring grooves, respectively.

Here, the piston ring includes an oil ring for scraping off oil on the wall surface of the cylinder so as to prevent the oil from entering the combustion chamber and a compression ring clung between the piston and the cylinder wall and maintaining airtightness so as to prevent combustion gas from leaking and at the same time receiving heat from the piston and transferring the heat to the cylinder wall.

In addition, a land portion is formed between the ring grooves such that the piston ring is seated and supported on the land portion and reciprocating movement of the piston is performed.

In general, configuration of the piston ring is produced by applying a proper design configuration in consideration of advantages and disadvantages that may occur depending on driving conditions or traveling conditions of a vehicle from designer's viewpoint.

For example, if the cross-sectional shape of the piston ring is of a rectangular shape, an advantageous effect is realized in that it is easy to manufacture and stability under middle or low speed driving conditions or acceleration/deceleration driving conditions is improved, whereas if the cross-sectional shape of the piston ring is of an internal bevel shape, another advantageous effect is realized in that airtight action is strengthened and behavior at the time of high speed driving is stabilized.

On the contrary, each of the shapes as mentioned above has also disadvantages. If the cross-sectional shape of the piston ring is of the rectangular shape, a vibrating phenomenon occurs due to increase in inertia of the ring under high speed driving conditions, whereas if the cross-sectional shape of the piston ring is of the internal bevel shape, sealing performance is deteriorated due to unevenness in the amount of torsion of the ring under the middle or low speed or acceleration/deceleration driving conditions.

In other words, the piston ring to which a single pattern is applied has advantages and disadvantages that are clearly distinguished depending on the shape of the ring.

As the foregoing described as the background art is just to promote better understanding of the background of the present disclosure, it must not be taken as an admission that it corresponds to the prior art well known to those who have to ordinary skill in the art.

SUMMARY

An object of the present disclosure is to provide a piston ring for an engine that is configured such that two different cross-sectional shapes are alternately formed to secure stability of behavior even under various driving conditions such as high speed, medium or low speed and acceleration deceleration driving conditions, thereby minimizing oil consumption and discharge of blow-by gas.

In one aspect of the present disclosure for accomplishing the object as mentioned above, a piston ring for an engine comprises a compression ring fitted into one of a plurality of ring grooves of a piston head, wherein the compression ring includes: a first section of which a cross-section has a quadrangular shape and a second section of which a cross-section has an internal bevel shape having a bevel surface on a top corner of an inner peripheral surface. The first and second sections are alternately arranged along a circumferential direction of the ring.

The compression ring is a top ring to be fitted into a ring groove located at the uppermost end among a plurality of ring grooves formed on the piston head.

The compression ring further comprises a transition section connecting between the first section and the second section wherein cross-sectional shapes of both ends of the transition section are the same as the cross-sectional shapes of their respective adjacent sections, a cross-sectional shape of the transition section is of an internal bevel shape and width of a bevel surface is gradually widened as it goes from the first section to the second section.

The compression ring is configured such that radial thicknesses of the first section and the second section are equal to each other.

The compression ring is chamfered such that angle of the bevel surface in the second section is 45°.

Height of the bevel surface in the second section is designed to be a value obtained by multiplying width of the compression ring by a first factor when the width of the compression ring is equal to or less than a predetermined length, or a value obtained by multiplying the width of the compression ring by a second factor when the width of the compression ring is longer than the predetermined length, the first factor being a value larger than the second factor, The second factor is a value of 0.93 to 0.95 times the first factor.

According to the piston ring for an engine having a structure configured as described above, a cross-sectional shape in a quadrangular shape and a cross-sectional shape in an internal bevel shape are all applied to the compression ring so that behavior of the piston ring under high speed driving condition is stabilized by virtue of torsion in the bevel shaped section and behavior of the piston ring under medium or low speed or acceleration/deceleration driving conditions is stabilized by virtue of the quadrangular shaped section and thus, stability of behavior of the piston ring under various driving conditions can be secured.

Further, since stability of behavior of the piston ring is secured, airtightness is ultimately enhanced by the compression ring and thus, oil consumption can be improved and leakage of blow-by gas can be minimized.

In addition, since a cross-sectional shape in a quadrangular shape and a cross-sectional shape in an internal bevel shape are alternately provided in the compression ring, torsional rigidity of the compression ring itself can be increased and thus, stability of behavior of the ring in the groove at the time of relative movement of the cylinder can be increased.

DESCRIPTION OF SPECIFIC EMBODIMENTS

A piston ring for an engine according to a preferred embodiment of the present disclosure will now be described in detail with reference to the accompanying drawings.

Figure 1:
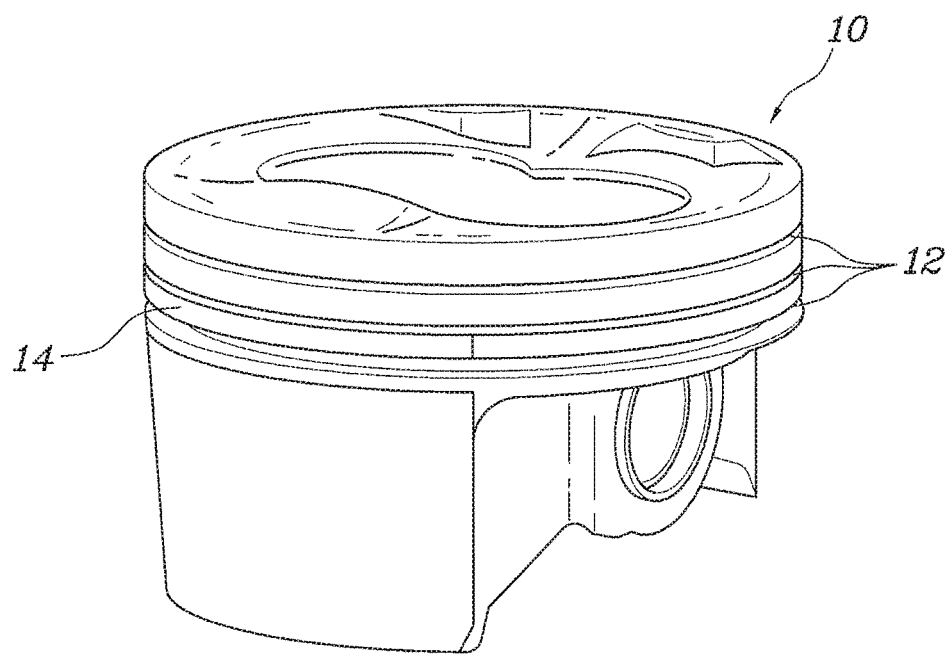
FIG. 1 is a perspective view showing a piston according to an exemplary embodiment of the present disclosure.
Figure 2:
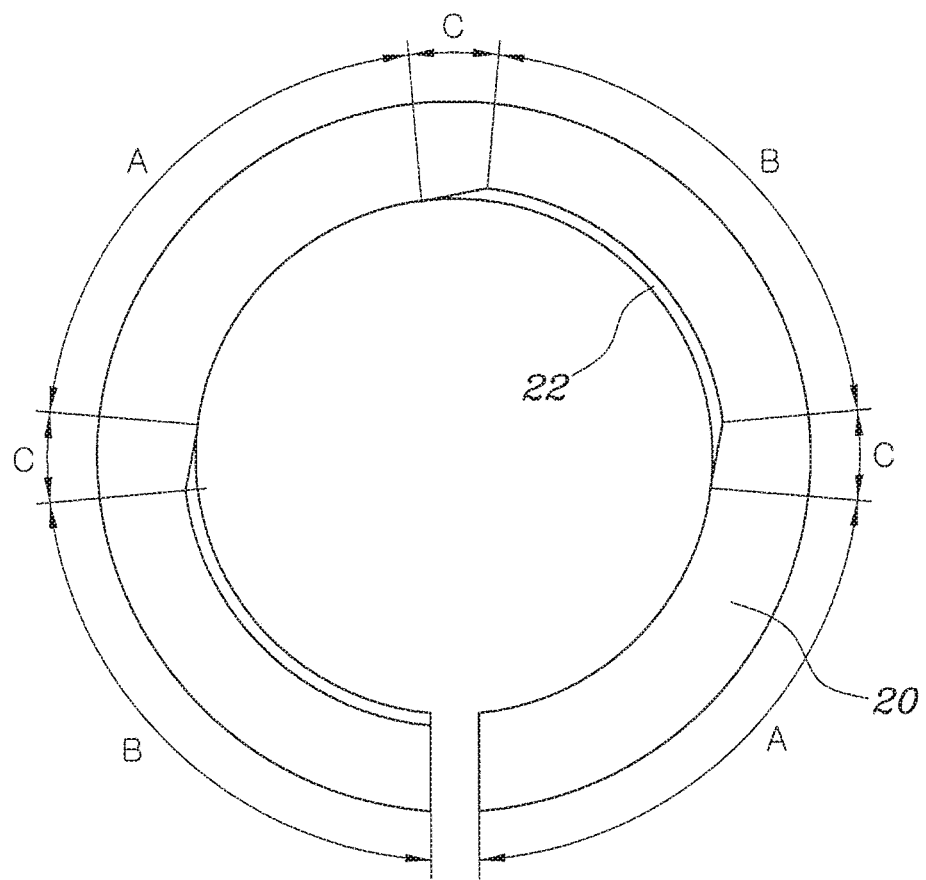
FIG. 2 is a plan view showing a compression ring according to an exemplary embodiment of the present disclosure.
Figure 3:
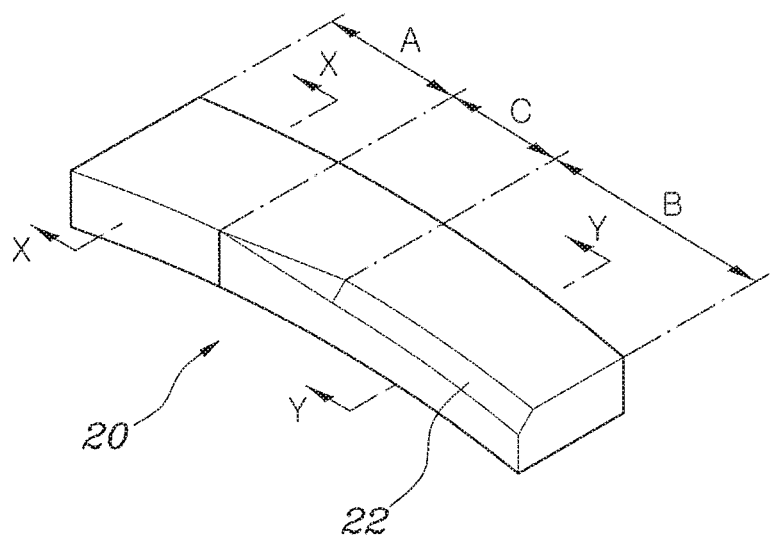
FIG. 3 is a detailed view showing a compression ring according to an exemplary embodiment of the present disclosure.
Figure 4:
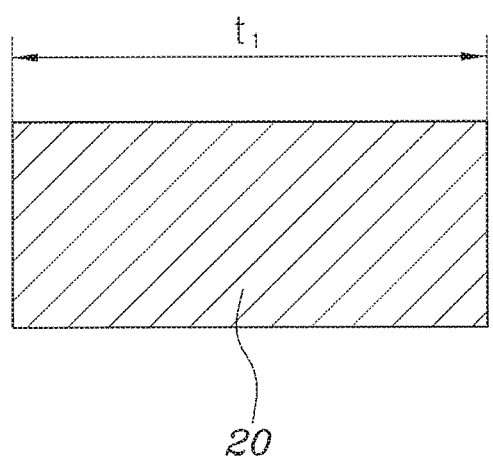
FIG. 4 is a cross-sectional view taken along the line X-X in FIG. 3.
Figure 5:
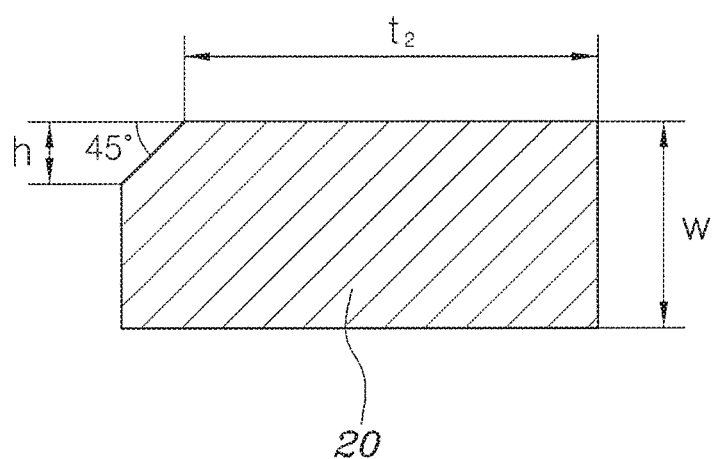
FIG. 5 is a cross-sectional view taken along the line Y-Y in FIG. 3.
Figure 6:
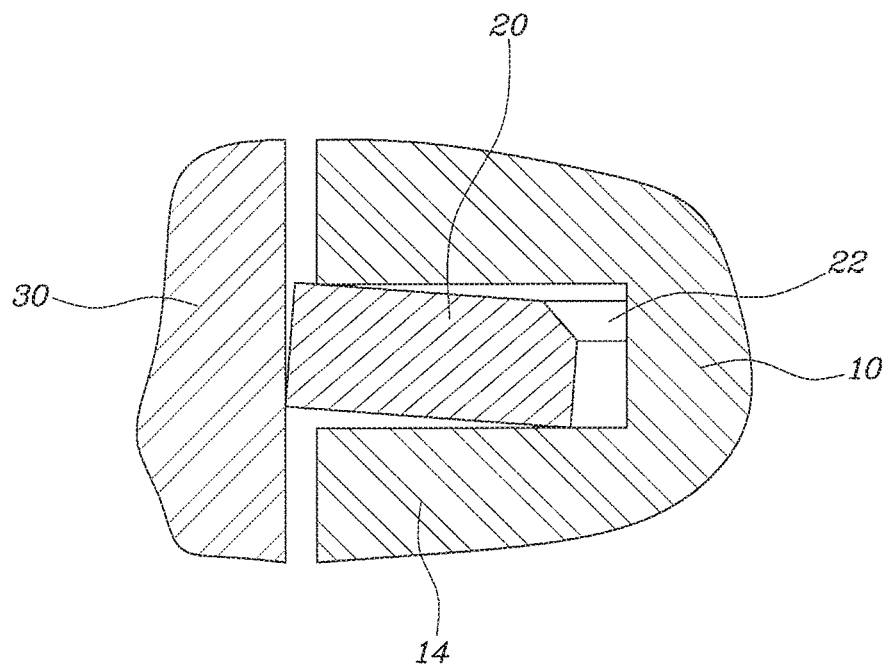
FIG. 6 is a view showing behavior of a second section of a compression ring according to an exemplary embodiment of the present disclosure.

FIG. 1 is a perspective view showing a piston according to an exemplary embodiment of the present disclosure, FIG. 2 is a plan view showing a compression ring according to an exemplary embodiment of the present disclosure, FIG. 3 is a detailed view showing a compression ring according to an exemplary embodiment of the present disclosure, FIG. 4 is a cross-sectional view taken along the line X-X in FIG. 3, FIG. 5 is a cross-sectional view taken along the line Y-Y in FIG. 3, and FIG. 6 is a view showing behavior of a second section of a compression ring according to an exemplary embodiment of the present disclosure.

Firstly, referring to FIGS. 1-3, a piston ring for an engine according to an embodiment of the present disclosure may comprise a compression ring 20 to be fitted into one of plurality of ring grooves 12 formed on a piston head 10 wherein the compression ring is configured such that a first section A of which cross-sectional shape is of a quadrangular shape and a second section B of which cross-sectional shape is of an internal bevel shape formed with a bevel surface 22 formed on a top corner of an inner peripheral surface by chamfering are formed alternately along a circumferential direction of the ring.

The piston head 10 is configured such that combustion stroke is performed in the cylinder while the piston head reciprocates upward and downward in the cylinder according to movement of a connecting rod.

The compression ring 20 according to the present disclosure is fitted into the ring groove 12 formed on the piston head 10 and maintains airtightness of a combustion chamber in which combustion is substantially carried out while reciprocating upward and downward together with the piston head 10.

Particularly, the compression ring 20 according to the present disclosure is configured such that the first section A of which cross-sectional shape is of a rectangular shape and the second section 3 of which cross-sectional shape is of an internal bevel shape are alternately formed.

In general, if the cross-section of the compression ring 20 is of a rectangular shape, inertia is reduced and thus stability of behavior in an up and down direction is secured when a vehicle is traveling at a middle or low speed or under acceleration/deceleration, whereas inertia increases and a phenomenon of vibrating in an up and down direction occurs and thus the stability of behavior is deteriorated when the vehicle is traveling at a high speed.

On the contrary, if the cross section is of an internal bevel shape, the compression ring 20 is twisted upward because the top side thereof, on which a bevel surface 22 is formed, is relatively weakened in rigidity. Incidentally, there is a phenomenon that the stability of behavior of the ring is rather improved because of twisting force of the ring itself when the vehicle is traveling at the high speed whereas torsional force of the ring occurs unevenly and thus the stability of behavior of the ring is reduced when the vehicle is traveling at the middle or low speed or under acceleration/deceleration.

Conventional piston rings are manufactured in such a manner that cross-sectional shapes of all sections thereof are formed in the same shape so that advantages and disadvantages according to driving conditions are clearly distinguished depending on the cross-sectional shape. However, the compression ring 20 according to the present disclosure is manufactured to have a plurality of cross-sectional shapes because the first section A and the second section B are alternately formed, so that the stability of behavior of the ring is secured under all driving conditions including high speed, middle or low speed and acceleration or deceleration driving conditions.

In other words, according to the compression ring 20, a ring face side in the second section B having an internal bevel-shaped cross section, which is an outer peripheral surface, rises upward relatively and an inner peripheral side in the second section descends downward relatively as shown in FIG. 6 when the vehicle is in a high speed driving mode. By this twisting, stability of behavior of the compression ring 20 can be secured even in the high speed driving mode. The reference number 30 illustrated in FIG. 6 refers to a cylinder wall 30.

On the other hand, when the vehicle is in a middle or low speed or acceleration/deceleration driving mode, amount of movement in an up and down direction in the first section A having a quadrangle shaped cross-section is small and thus, the stability of behavior can be secured relatively.

As described above, the compression ring 20 according to the present disclosure can secure the stability of behavior of the ring under various driving conditions of the vehicle so that oil consumption and leakage of blow-by gas can be effectively prevented.

In this case, the compression ring 20 may be a top ring to be fitted into a ring groove located at the uppermost end among a plurality of ring grooves 12 formed on the piston head 10.

Therefore, applying the compression ring 20 excellent in stability of behavior and airtightness to the top ring makes it possible to effectively prevent a situation where loss of pressure in the cylinder or fluctuation of engine compression ratio occurs.

In addition, since the compression ring 20 is configured such that two different cross-sectional shapes are alternately formed, torsional rigidity of the compression ring 20 can be increased. This can also be a factor of increasing the stability of behavior of the compression ring 20.

On the other hand, referring to FIG. 3, the compression ring 20 according to an embodiment of the present disclosure further comprises a transition section C connecting between the first section A and the second section B wherein cross-sectional shapes of both ends of the transition section are the same as the cross-sectional shapes of their respective adjacent sections, a cross-sectional shape of the transition section is of an internal bevel shape and width of a bevel surface 22 is gradually widened as it goes from the first section A to the second section B.

In other words, if only the first section A and the second section B, of which cross-sectional shapes are different from each other, are alternately formed in the compression ring 20, a sharp edge portion resulting from a difference between the cross-sectional shapes is formed, which may cause the compression ring 20 to be easily worn or damage the piston head 10.

Therefore, the compression ring 20 according to the present disclosure is provided with the transition section C between the first section A and the second section B to prevent the sharp edge due to the difference between the two cross-sectional shapes from being formed.

Particularly, the transition section C is designed in such a manner that a cross-sectional shape of a connection portion connected to the first section A is of a rectangular shape while a cross-sectional shape of the remaining portion is of an internal bevel shape in which width of the bevel surface 22 is gradually widened as it closes to the second section 3. This configuration can prevent durability of a product from being deteriorated due to the sharp edge.

However, the transition section C makes it difficult to obtain the same effect as obtained by the first section A and the second section B, that is, the effect that the compression ring 20 can secure the stability of behavior by the first section A and the second section B. Therefore, the compression ring 20 may be designed to minimize the transition section C in such an extent that durability of a product is not deteriorated, so that the first section A and the second section B can be sufficiently secured to maximize the stability of behavior.

On the other hand, referring to FIGS. 3 to 5, the compression ring 20 is configured such that radial thickness t1 of the first section A is equal to radial thickness t2 of the second section B.

In other words, since radial thicknesses in the entire sections of the compression ring 20 are equal to each other, productivity of a product is enhanced.

Referring to FIG. 5, in this embodiment of the present disclosure, the compression ring 20 may be chamfered such that angle of the bevel surface 22 in the second section B is 45°.

In addition, height h of the bevel surface in the second section B is designed to be a value obtained by multiplying width w of the compression ring 20 by a first factor when the width w of the compression ring 20 is equal to or less than a predetermined length, or a value obtained by multiplying the width w of the compression ring 20 by a second factor when the width w of the compression ring 20 is longer than the predetermined length, wherein the first factor is a value larger than the second factor.

In general, the axial length of the compression ring 20 is expressed as width w wherein the compression ring 20 has a mass proportional to the width w.

For example, assuming that the predetermined length is 1 mm, when the width w of the compression ring 20 is 1 mm, the height h of the bevel surface 22 is calculated using a relatively large first factor so that the height h of the bevel surface 22 is formed to be larger than the width w of the compression ring 20, whereas when the width w of the compression ring 20 is 1.2 mm, the height h of the bevel surface 22 is calculated using a relatively small second factor so that the height h of the bevel surface 22 is formed to be smaller than the width w of the compression ring 20.

This is intended to increase size of the bevel surface 22 so as to prevent the stability of behavior from being reduced due to decrease of mass of the ring when the width w of the compression ring 20 is small. Therefore, it is possible to secure the stability of behavior of the compression ring 20, which ultimately enhances airtightness and prevents oil from is being excessively consumed.

Specifically, the second factor may be a value of 0.93 to 0.95 times the first factor.

For example, the first factor may be set to 0.35 and the second factor may be set to 0.33. This means that the second factor may be set to a value that is reduced by 6% as compared to the first factor. However, the numerical values as indicated above are nothing but values merely described for the sake of understanding, and should not be considered as limitation of numerical values because they can be varied depending on a designer or a vehicle.

Consequently, the behavior of the compression ring 20 can be stabilized so that airtightness in the combustion chamber is secured and an oil leakage phenomenon can be effectively prevented.

According to the piston ring for an engine having a structure configured as described above, a cross-sectional shape in a quadrangular shape and a cross-sectional shape in an internal bevel shape are all applied to the compression ring so that behavior of the piston ring under the high speed driving conditions is stabilized by virtue of torsion in the bevel shaped section and behavior of the piston ring under the medium or low speed or acceleration/deceleration driving conditions is stabilized by virtue of the quadrangular shaped section and thus, stability of behavior of the piston ring under various driving conditions can be secured.

Further, since stability of the behavior of the piston ring is secured, airtightness is ultimately enhanced by the compression ring and thus, oil consumption can be improved and leakage of blow-by gas can be minimized.

In addition, since cross-sectional shape in a quadrangular shape and a cross-sectional shape in an internal bevel shape are alternately provided in the compression ring, torsional rigidity of the compression ring itself can be increased, and thus, stability of behavior of the ring in the groove at the time of relative movement of the cylinder can be increased.

Although the present disclosure has been described and illustrated with respect to specific embodiments, it will be apparent by those who have ordinary skill in the art that various modifications and changes to the present disclosure may be made without departing from the spirit and scope of the present disclosure as defined in the appended patent claims.

What is claimed is:
1. A piston ring for an engine, comprising:
a compression ring configured to fit into one of a plurality of ring grooves of a piston head, wherein the compression ring includes:
two first sections of which a cross-section has a quadrangular shape;
two second sections of which a cross-section has a first internal bevel shape having a first bevel surface on a top corner of an inner peripheral surface, wherein a width of the first bevel surface is substantially constant throughout the second section; and
at least one transition section between each first section and at least one of the second sections, wherein cross-sections of both ends of the at least one transition section correspond to cross-sections of respective adjacent sections of the first and second sections,
wherein the first section and the second section are alternately arranged along a circumferential direction of the piston ring, and wherein a cross-section of the at least one transition section has a second internal bevel shape having a second bevel surface, and wherein a width of the second bevel surface gradually increases from the first section toward the second section.

2. The piston ring of claim 1, wherein the compression ring is intended to be used as a top ring fitted into a ring groove located at an uppermost end among the plurality of ring grooves of the piston head.

3. The piston ring of claim 1, wherein the first section and the second section have a same radial thickness.

4. The piston ring of claim 1, wherein the compression ring is chamfered such that an angle of the bevel surface of the second section is 45°.

5. The piston ring of claim 1, wherein a height of the first bevel surface of the second section is designed to be equal to a width of the compression ring multiplied with a first factor if the width of the compression ring is equal to or less than a predetermined length, and wherein the first factor is larger than a second factor.

6. The piston ring of claim 5, wherein the second factor is a value of 0.93 to 0.95 times the first factor.

7. The piston ring of claim 5, wherein a height of the first bevel surface of the second section is designed to be equal to the width of the compression ring multiplied with a second factor if the width of the compression ring is longer than the predetermined length.

* * * * *